(12) United States Patent  
Kukoleca

(10) Patent No.: US 7,593,986 B2
(45) Date of Patent: Sep. 22, 2009

(54) METHOD AND SYSTEM FOR GENERATING A ROUTING TABLE FOR A CONFERENCE

(75) Inventor: Dalibor Kukoleca, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 11/124,911

(22) Filed: May 9, 2005

(65) Prior Publication Data
US 2006/0253532 A1    Nov. 9, 2006

(51) Int. Cl.
*G06F 15/16*    (2006.01)
(52) U.S. Cl. ...................... 709/204; 370/260
(58) Field of Classification Search ............... 709/204; 370/260
See application file for complete search history.

(56) References Cited

U.S. PATENT DOCUMENTS

| | | | | | |
|---|---|---|---|---|---|
| 4,710,917 | A | * | 12/1987 | Tompkins et al. | 709/204 |
| 5,084,870 | A | * | 1/1992 | Hutchison et al. | 370/258 |
| 5,610,920 | A | * | 3/1997 | Doll et al. | 370/389 |
| 5,867,653 | A | * | 2/1999 | Aras et al. | 709/204 |
| 6,657,975 | B1 | * | 12/2003 | Baxley et al. | 370/260 |
| 6,850,496 | B1 | * | 2/2005 | Knappe et al. | 370/260 |
| 7,240,364 | B1 | * | 7/2007 | Branscomb et al. | 726/9 |
| 7,376,710 | B1 | * | 5/2008 | Cromwell et al. | 709/219 |
| 2002/0172199 | A1 | * | 11/2002 | Scott et al. | 370/389 |
| 2003/0112947 | A1 | * | 6/2003 | Cohen | 379/202.01 |
| 2004/0047461 | A1 | * | 3/2004 | Weisman et al. | 379/202.01 |
| 2004/0057385 | A1 | * | 3/2004 | Roshko | 370/252 |
| 2005/0064875 | A1 | * | 3/2005 | Gonsalves et al. | 455/454 |
| 2005/0213727 | A1 | * | 9/2005 | Nir et al. | 379/202.01 |
| 2005/0266388 | A1 | * | 12/2005 | Gross et al. | 434/350 |
| 2006/0083182 | A1 | * | 4/2006 | Tracey | 370/260 |
| 2006/0245378 | A1 | * | 11/2006 | Jeong et al. | 370/261 |
| 2006/0245379 | A1 | * | 11/2006 | Abuan et al. | 370/261 |

OTHER PUBLICATIONS

U.S. Appl. No. 11/124,902, filed May 9, 2005, Kukoleca et al.
U.S. Appl. No. 10/856,262, filed May 27, 2004, Huai.

* cited by examiner

*Primary Examiner*—William C Vaughn, Jr.
*Assistant Examiner*—Boris Gorney
(74) *Attorney, Agent, or Firm*—Perkins Coie LLP

(57) ABSTRACT

A conference system provides a routing table that specifies which sinks are connected to which sources. When the conference system receives the content from the video source, it routes the content to the video sink. When the conference type is full mix, the hub computer system is responsible for mixing the content received from the various endpoints and sending the mixed content to the endpoints. When the conference system receives content from various endpoints, it determines which sinks are to receive content from which sources based on the routing table. For each unique combination of sources that a sink is to receive, the conference system mixes the content from that unique combination of sources. The conference system then sends the mixed content to the sinks that are to receive that unique combination. The conference system generates a routing table that identifies the connections between the sinks and sources of a conference to track the unique combinations.

16 Claims, 7 Drawing Sheets

Full Mesh 110

Full Mix 120

METHOD AND SYSTEM FOR GENERATING A ROUTING TABLE FOR A CONFERENCE

CROSS-REFERENCE TO RELATED APPLICATION(S)

This application is related to U.S. patent application Ser. No. 11/124,902, entitled "Method and System for Providing an Interface Through Which an Application Can Access a Media Stack," and filed concurrently, which is hereby incorporated by reference.

TECHNICAL FIELD

The described technology relates generally to conferences and particularly to establishing connections between endpoints of participants of a conference.

BACKGROUND

Video conferencing allows conference participants who are at different locations to participate in a conference. Typically, each conference participant has a computer-based video conferencing system that includes a video camera, a microphone, a display device, and a speaker. The video conferencing system of a conference participant captures the video and audio of that conference participant using the video camera and microphone and transmits the video and audio to the video conferencing systems of the other conference participants. When a video conferencing system receives the video and audio from the other conference participants, it presents the video on the display device and outputs the audio to the speaker. A video conferencing system may display each video in a different window on the display device or in a different area of a window. Thus, the conference participants can view the video and hear the audio of the other conference participants.

In order to send and receive content, the computer systems of the conference participants need to be connected. The computer systems can be directly or indirectly connected to each other. The connection types of a conference can be classified based on whether the connections are direct or indirect as "full mesh" and "full mix." In a full mesh conference, each participant computer system has a direct connection to each other participant computer system. Thus, each participant computer system transmits its video and audio directly to each other participant computer system, and each participant computer system receives video and audio directly from each other participant computer system. In a full mix conference, each participant computer system only has a direct connection to a distinguished or hub computer system. Each participant computer system transmits its video and audio directly to the hub computer system, which in turn transmits the video and audio it receives from one participant computer system to the other participant computer systems. Thus, each participant computer system only needs to establish a connection to the hub computer system and is indirectly connected to the other participant computer systems.

To support a video and audio conference, each connection has a video channel and an audio channel. Each channel includes a send stream and a receive stream for sending and receiving content of the channel. Each endpoint of a channel includes a source and a sink that are connected to the streams of the channel. For example, the source and the sink of an audio channel are microphones and speakers, respectively. For both streams of an audio channel, a microphone is connected at one endpoint and a speaker is connected at the other endpoint.

Each endpoint of each stream of a channel may have a media stack of components that implement the functions of the stream. The components of the media stack of an audio channel for a source may receive audio content in PCM format, convert the audio content from PCM format to G.722 format, packetize the audio content that is in the G.722 format, and transmit the packetized content to the other endpoints. The components of a media stack of an audio channel for a sink may receive packetized audio content from the other endpoints, de-packetize the received content, convert the de-packetized content from G.722 format to PCM format, and provide the content in PCM format to the local sink.

To conduct a conference, the content generated by each video and audio source needs to be routed to each video and audio sink. In a full mesh conference, each participant computer system receives content from the other participant computer systems and mixes the content so that it can be presented to the participant. For example, the video received from the other participant computer systems may be mixed by simultaneously displaying each video in a separate area of a window. The audio received from the other participant computer systems may be mixed by taking the average of the audio samples provided by the participant computer systems for each sampling time. In a full mix conference, the hub computer system may perform the mixing and then send the mixed content to each of the participant computer systems.

The routing and mixing of content can be complex when a conference includes many participants and the sources and sinks of various endpoints can be connected in different ways. For example, a certain sink at one endpoint may want to receive and mix content from only some of the sources. It would be desirable to have a technique that would allow for the efficient routing and mixing of content in such situations.

SUMMARY

A conference system provides a routing table that specifies which sinks are connected to which sources. When the conference system receives the content from the video source, it routes the content to the video sink. When the conference type is full mix, the hub computer system is responsible for mixing the content received from the various endpoints and sending the mixed content to the endpoints. When the conference system receives content from various endpoints, it determines which sinks are to receive content from which sources based on the routing table. For each unique combination of sources that a sink is to receive, the conference system mixes the content from that unique combination of sources. The conference system then sends the mixed content to the sinks that are to receive that unique combination.

The conference system generates a routing table that identifies the connections between the sinks and sources of a conference. The conference system provides, for each connection type, rules that specify which source types are to be connected to which sink types. A rule specifies a sink type and the source types of the sources that are to be connected to sinks of that sink type. The conference system generates the routing table by updating the connections of the routing table when each channel is added to the conference. When a new channel is added, the conference system identifies the connections between the source and sink of the added channel and the sources and sinks of existing channels of the conference based on the specified rules. The conference system then updates the routing table to specify the identified connections.

DETAILED DESCRIPTION

Figure 1:
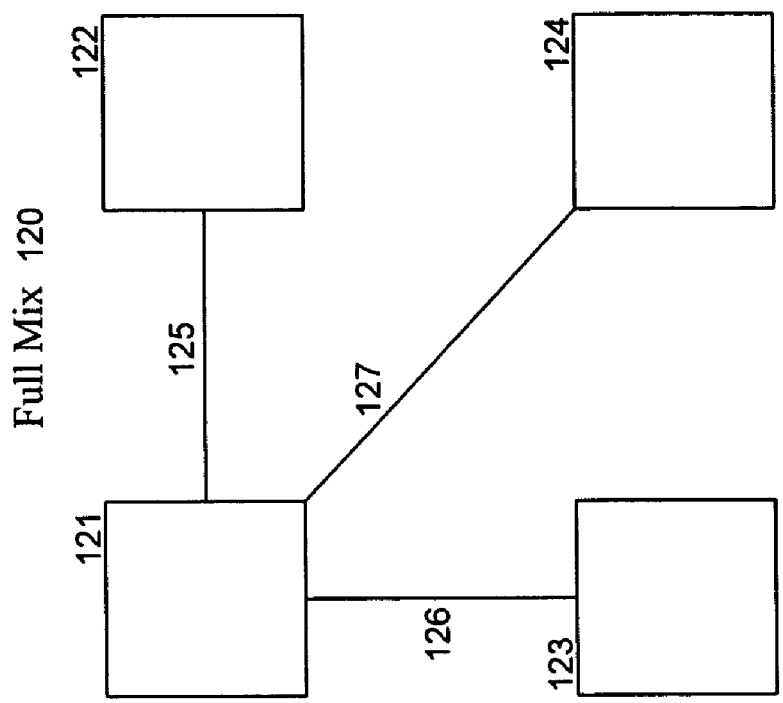
FIG. 1 is a block diagram that illustrates the connection types of conferences of the conference system in one embodiment.
Figure 1:
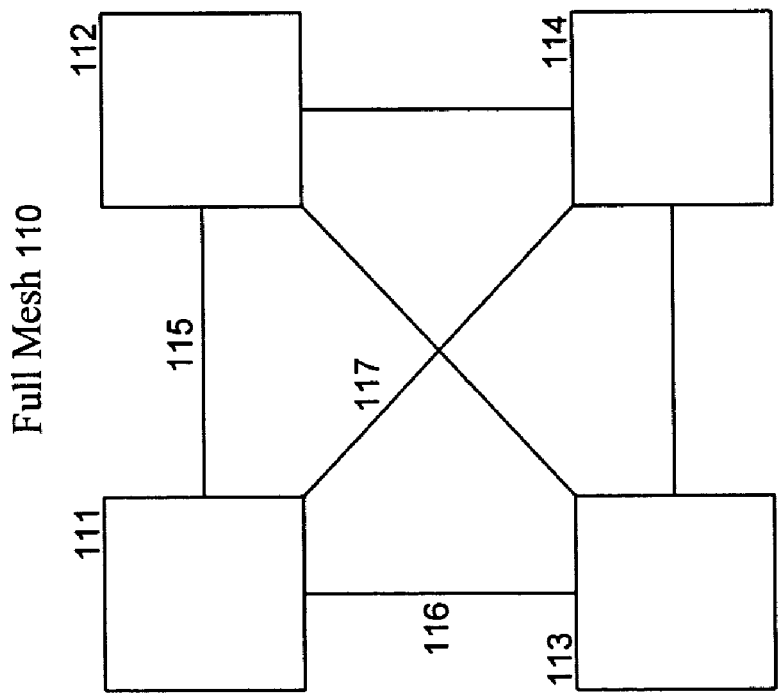

A method and system for routing content to endpoints of a conference is provided. In one embodiment, the conference system provides a routing table that specifies which sinks are connected to which sources. For example, if a conference participant wants to view their own video, then the routing table would specify that the video source of a local endpoint is to be connected to the video sink of a local endpoint. When the conference system receives the content from the video source, it routes the content to the video sink. When the conference type is full mix, the hub computer system is responsible for mixing the content received from the various endpoints and sending the mixed content to the endpoints. (When the conference type is full mesh, each endpoint is responsible for mixing the content received directly from the other endpoints.) When the conference system receives content from various endpoints, it determines which sinks are to receive content from which sources based on the routing table. For each unique combination of sources that a sink is to receive, the conference system mixes the content from that unique combination of sources. The conference system then sends the mixed content to the sinks that are to receive that unique combination. For example, assuming a conference type of full mix, if endpoint A is to receive audio content from endpoints B, C, and D and endpoint B is to receive content from endpoints A, C, and D, but audio content for a certain period is only received from endpoints C and D, then endpoints A and B are to receive content from the same combination of endpoints for that period since there was no content received from endpoints A and B. In such a case, the conference system at the hub computer system mixes the content from endpoints C and D once and sends the same mixed content to endpoints A and B. In one embodiment, when the conference system provides content to the media stack of one channel, the media stack may return the content in a converted format. The conference system stores the converted content in a buffer along with the unconverted content. When the conference system provides the content to the media stack of another channel, the media stack of the other channel detects that the buffer contains the converted content and can then use it without having to reconvert content. In this way, the conference system can reduce the mixing that needs to be performed when multiple sinks receive content from the same combination of sources and the converting that needs to be done when multiple channels convert the same content to the same format.

In one embodiment, the conference system generates a routing table that identifies the connections between the sinks and sources of a conference. The conference system provides, for each connection type, rules that specify which source types are to be connected to which sink types. The source type and sink types may include local and remote sources and sinks and, for local sources and sinks, non-virtual and virtual sinks and sources. The connection types include full mesh and full mix. Virtual sources and sinks are software components that serve as sources and sinks of content, and non-virtual sources and sinks are physical devices that serve as sources and sinks of content. For example, a microphone connected to an audio channel is a non-virtual source, and a software component that reads a PCM file and provides its content to an audio channel is a virtual source. Virtual sources and sinks are described as media sender objects and media receiver objects in U.S. patent application Ser. No. 11/124, 902, entitled "Method and System for Providing an Interface Through Which an Application Can Access a Media Stack," filed concurrently, which is hereby incorporated by reference. A rule specifies a sink type and the source types of the sources that are to be connected to sinks of that sink type. For example, a rule may specify a local non-virtual sink is to be connected to each local virtual source and each remote source, but not to local non-virtual sources. For example, a local speaker may be connected to a local virtual microphone, but not to a local non-virtual microphone. This rule may be appropriate when a participant wants to hear background music generated by the virtual microphone, but not hear their own voice over the speaker. The conference system generates the routing table by updating the connections of the routing table when each channel is added to the conference. When a new channel is added, the conference system identifies the connections between the source and sink of the added channel and the sources and sinks of existing channels of the conference based on the specified rules. The conference system then updates the routing table to specify the identified connections. In this way, the conference system can use a routing table to control the routing of content from sources to sinks.

Tables 1A and 1B specify the rules for connecting endpoints in conferences of full mix and full mesh connection types. Table 1A specifies the rules for setting the connections for a full mix conference. The first row of Table 1A indicates that a local non-virtual sink is connected to each local virtual source and each remote source. The third row of Table 1A indicates that a remote sink is connected to each local source (i.e., virtual and non-virtual) and each remote source, except that the sink of a remote endpoint is not connected to the source of the same remote endpoint. Table 1B specifies the rules for setting the connections for a full mesh conference. Table 1B is the same as Table 1A, except that the remote endpoints are not connected together, since in a full mesh conference each endpoint is connected to every other endpoint. The creating of the routing table using these rules may correspond to a default behavior of the conference system. The conference system may also expose the routing table so an external application can customize the connections.

TABLE 1A

Rules for Full Mix

| Sink | Source |
|---|---|
| Local Non-Virtual | Local Virtual and Remote |
| Local Virtual | Local and Remote |
| Remote | Local and Remote (except same endpoint) |

TABLE 1B

Rules for Full Mesh

| Sink | Source |
|---|---|
| Local Non-Virtual | Local Virtual and Remote |
| Local Virtual | Local and Remote |
| Remote | Local |

In the following example, the conference system creates a routing table by adding a channel with local non-virtual endpoints (i.e., source le.1 and sink le.1), a channel with local virtual endpoints (i.e., source le.2 and sink le.2), and then two channels for remote endpoints (i.e., source re.1 and sink re.1 for one channel and source re.2 and sink re.2 for the other channel). Tables 2A-2D illustrate the building of the routing tables as the channels are added to a full mix conference.

When a channel with local non-virtual endpoints is added to the conference, the conference system adds a source row (le.1) and a sink column (le.1) to the routing table. The conference system then applies the rule for a local non-virtual sink. Since the new sink is a local non-virtual sink, the conference system connects it to local virtual sources and remote sources. Thus, the conference system does not connect sink le.1 to source le.1 since source le.1 is non-virtual and stores 0 in cell (le.1, le.1) to indicate no connection as illustrated in Table 2A.

TABLE 2A

Local Non-Virtual Endpoints Added

|  | le. 1 |
|---|---|
| le. 1 | 0 |

When a channel with local virtual endpoints is next added to the conference, the conference system adds a source row (le.2) and a sink column (le.2) to the routing table. In this case, the conference system first applies the rules for the new sink to each existing source (including the new source) and then applies the rules for each existing sink to the new source. Since the new sink is a local virtual sink, the conference system connects it to local sources and remote sources. Thus, the conference system connects sink le.2 to source le.1 and source le.2 and stores 1 in cells (le.1, le.2) and (le.2, le.2) as illustrated in Table 2B. The conference system then applies the rules for the existing sinks—only le.1. Since the existing sink le.1 is a non-virtual sink, the conference system connects it to local virtual sources and remote sources. Thus, the conference system connects sink le.1 to source le.2 and stores 1 in cell (le.2, le.1) as illustrated in Table 2B.

TABLE 2B

Local Virtual Endpoints Added

|  | le. 1 | le. 2 |
|---|---|---|
| le. 1 | 0 | 1 |
| le. 2 | 1 | 1 |

When a channel with remote endpoints is next added to the conference, the conference system adds a source row (re.1) and a sink column (re.1) to the routing table. The conference system first applies the rules for the new sink to each existing source (including the new source) and then applies the rules for each existing sink to the new source. Since the new sink is a remote sink, the conference system connects it to local sources and remote sources. Thus, the conference system connects new sink re.1 to sources le.1 and le.2 and stores 1 in cells (le.1, re.1) and (le.2, re.1) as indicated in Table 2C. Since the rules specify that the source and sink of the same remote endpoint are not connected, the conference system does not connect sink re.1 to source re.1 and stores 0 in cell (re.1, re.1) as indicated in Table 2C. The conference system then applies the rules for the existing sinks—le.1 and le.2. Since the existing sink le.1 is a non-virtual sink, the conference system connects it to local virtual sources and remote sources. Thus, the conference system connects sink le.1 to source re.1 and stores 1 in cell (re.1, le.1) as indicated in Table 2C. Since the existing sink le.2 is a virtual sink, the conference system connects it to local sources and remote sources. Thus, the conference system connects sink le.2 to source re.1 and stores 1 in cell (re.1, le.2) as indicated in Table 2C.

TABLE 2C

Remote Endpoints Added

|  | le. 1 | le. 2 | re. 1 |
|---|---|---|---|
| le. 1 | 0 | 1 | 1 |
| le. 2 | 1 | 1 | 1 |
| re. 1 | 1 | 1 | 0 |

When another channel with remote endpoints is next added to the conference, the conference system adds a source row (re.2) and a sink column (re.2) to the routing table. The conference system first applies the rules for the new sink to each existing source (including the new source) and then applies the rules for each existing sink to the new source. Since the new sink is a remote sink, the conference system connects it to local sources and remote sources. Thus, the conference system connects new sink re.2 to sources le.1, le.2 and re.1 and stores 1 into cells (le.1, re.2), (le.2, re.2), and (re.1, re.2) as indicated in Table 2D. Since the rules specify that a remote source and a remote sink of the same channel are not connected, the conference system does not connect sink re.2 to source re.2 and stores 0 in cell (re.2, re.2) as indicated in Table 2D. The conference system then applies the rules for the existing sinks—le.1, le.2, and re.1. Since the existing sink le.1 is a non-virtual sink, the conference system connects it to local virtual sources and remote sources. Thus, the conference system connects sink le.1 to source re.2 and stores 1 in cell (re.2, le.1) as indicated in Table 2D. Since the existing sink le.2 is a virtual sink, the conference system connects it to local sources and remote sources. Thus, the conference system connects sink le.2 to source re.2 and stores 1 in cell (re.2, le.2) as indicated in Table 2D. Since the existing sink re.1 is a remote sink, the conference system connects it to local sources and remote sources. Thus, the conference system connects sink re.1 to source re.2 and stores 1 in cell (re.2, re.1) as indicated in Table 2D.

TABLE 2D

Remote Endpoints Added

|       | le. 1 | le. 2 | re. 1 | re. 2 |
|-------|-------|-------|-------|-------|
| le. 1 | 0     | 1     | 1     | 1     |
| le. 2 | 1     | 1     | 1     | 1     |
| re. 1 | 1     | 1     | 0     | 1     |
| re. 2 | 1     | 1     | 1     | 0     |

Table 3 is the routing table corresponding to the routing table of Table 2 when the conference is full mesh. Since the conference is full mesh, the remote sources and sinks are not connected to each other as indicated by the 0 in cells (re.1, re.2) and (re.2, re.1).

TABLE 2D

|       | le. 1 | le. 2 | re. 1 | re. 2 |
|-------|-------|-------|-------|-------|
| le. 1 | 0     | 1     | 1     | 1     |
| le. 2 | 1     | 1     | 1     | 1     |
| re. 1 | 1     | 1     | 0     | 0     |
| re. 2 | 1     | 1     | 0     | 0     |

The conference system may modify the routing table as channels are added or removed from the conference or when the connection type of the conference is changed. The conference system may define different types of sinks and sources to allow greater flexibility in setting connections. For example, if a participant wants to view their own video content in a separate window from the window containing the video content of the other participants, the conference system can define a "preview" sink type with a rule indicating that it is to be connected to only local non-virtual sources. In addition, the source of an endpoint can be virtual and the sink of the endpoint can be non-virtual, and vice versa.

In addition, the conference system may allow channels to share sources and sinks. For example, if a first participant wants to send audio only to a second participant and not a third participant, but wants to receive audio from both the second and third participants, the conference system may connect a channel between the first and second participants to a speaker and a microphone at the first participant's endpoint and a channel between the first and third participants to the same speaker. Thus, audio of the first participant will be heard only by the second participant and the first participant will hear audio from both participants over the same speaker.

FIG. 1 is a block diagram that illustrates the connection types of conferences of the conference system in one embodiment. The illustrated conferences include four participant computer systems with one endpoint each. The full mesh conference 110 includes endpoints 111, 112, 113, and 114. Each endpoint is connected to each other endpoint by a direct connection. For example, endpoint 111 is connected to endpoint 112 via connection 115, endpoint 113 via connection 116, and endpoint 114 via connection 117. The full mix conference 120 includes endpoints 121, 122, 123, and 124. Each endpoint is connected to hub endpoint 121. In particular, endpoint 122 is connected to hub endpoint 121 via connection 125, endpoint 123 is connected to hub endpoint 121 via connection 126, and endpoint 124 is connected to hub endpoint 121 via connection 127. There are no connections between endpoints 122, 123, and 124. The hub endpoint 121 receives the content from the other endpoints, mixes the content, and sends the mixed content to the other endpoints. Although a single connection is shown between a pair of endpoints, there may be any number of bidirectional or unidirectional connections between a pair of endpoints.

Figure 2:
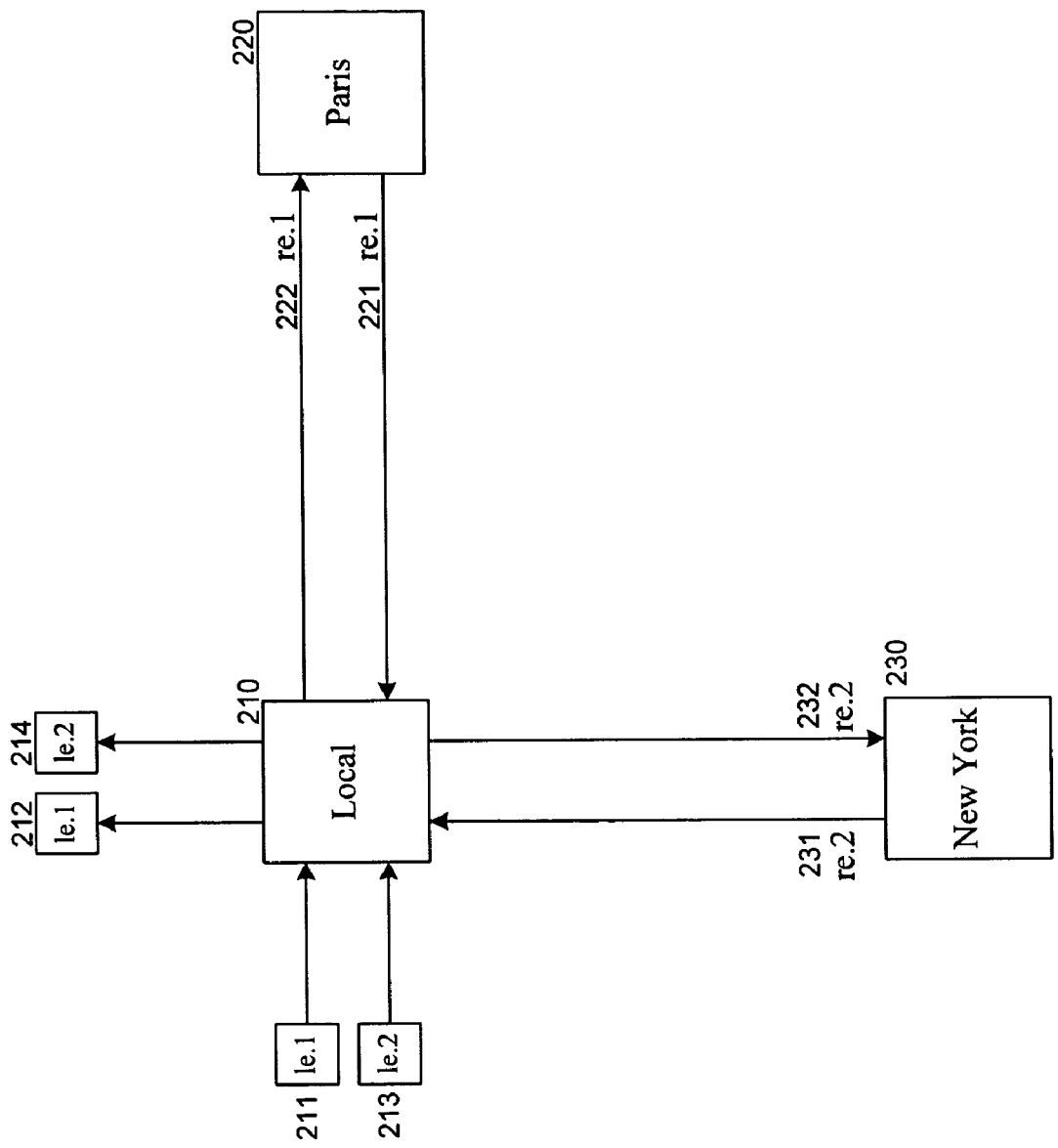
FIG. 2 is a block diagram that illustrates connections between a full mix conference with three participants.

FIG. 2 is a block diagram that illustrates connections between a full mix conference with three participants. The conference includes local computer system 210 and remote computer systems 220 and 230. The local computer system includes local endpoint sources 211 and 213 and local endpoint sinks 212 and 214. The remote computer system 220 includes a remote endpoint source 221 and a remote endpoint sink 222, and the remote computer system 230 includes a remote endpoint source 231 and a remote endpoint sink 232.

Figure 3:
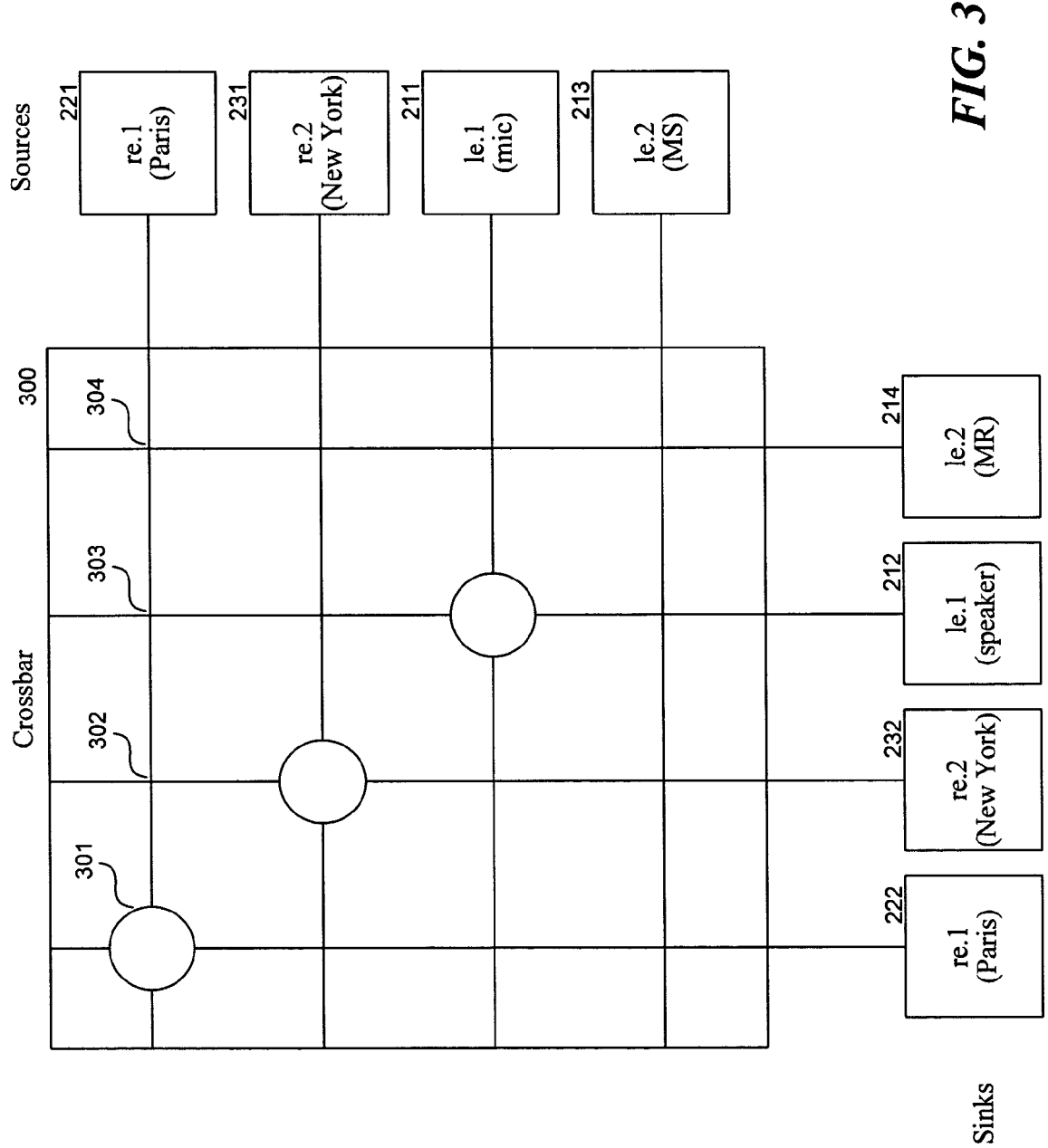
FIG. 3 is a block diagram that illustrates the connections between the endpoints of the full mix conference of FIG. 2 according to the routing table of Table 2D.

FIG. 3 is a block diagram that illustrates the connections between the endpoints of the full mix conference of FIG. 2 according to the routing table of Table 2D. The connections are illustrated by a logical crossbar 300 that includes inputs for the local endpoint sources 211 and 213 and the remote endpoint sources 221 and 231 and outputs for the local endpoint sinks 212 and 214 and the remote endpoint sinks 222 and 232. In this example, the local endpoint source 211 and the local endpoint sink 212 are non-virtual endpoints, and the local endpoint source 213 and the local endpoint sink 214 are virtual endpoints. The circles indicate that the source is not connected to the corresponding sink and the crossing lines indicate that the source is connected to the corresponding sink. For example, circle 301 indicates that remote endpoint source 221 is not connected to remote endpoint sink 222. Crossing lines 302, 303, and 304 indicate that remote endpoint source 221 is connected to remote endpoint sink 232, local endpoint sink 212, and local endpoint sink 214, respectively.

Figure 4:
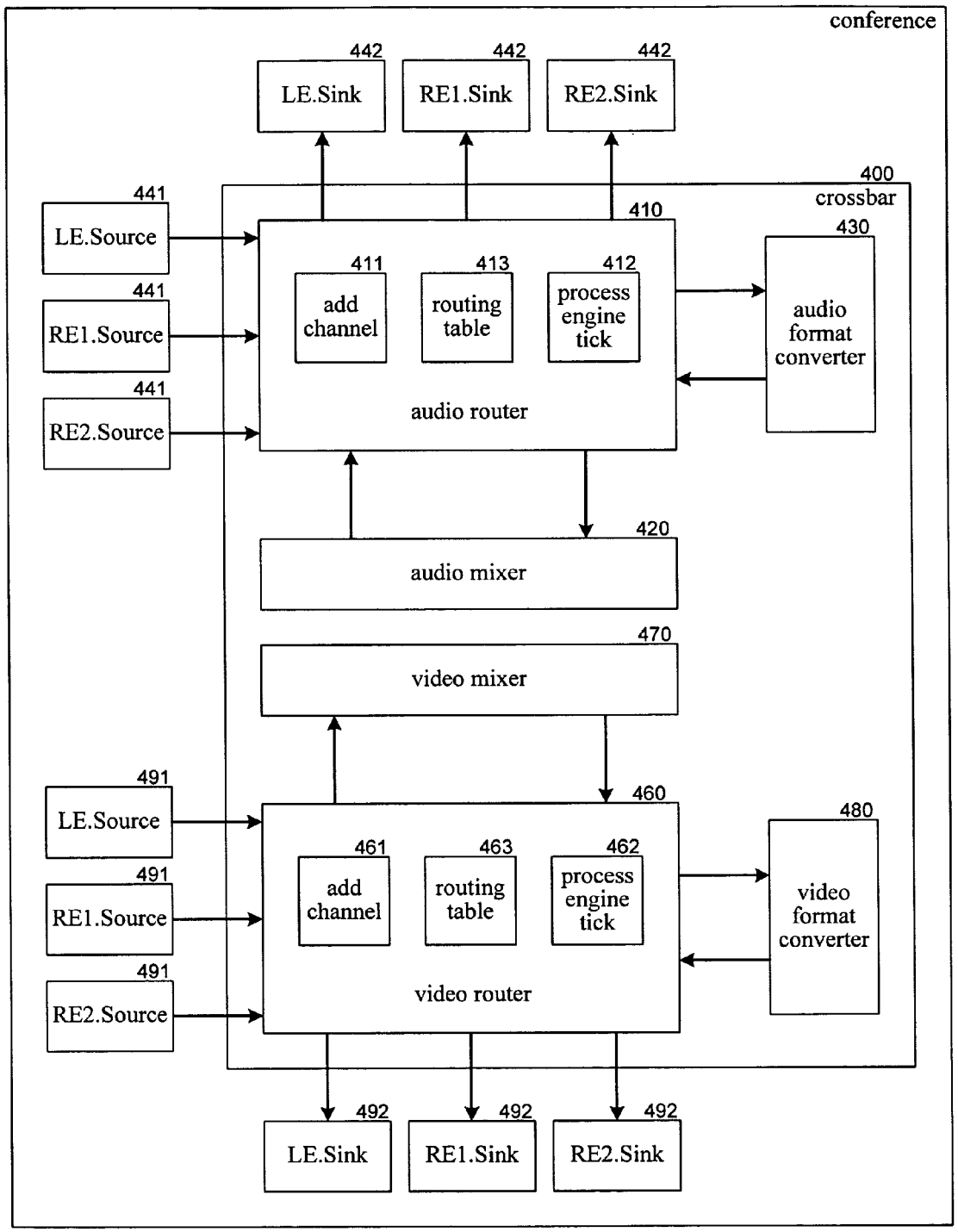
FIG. 4 is a block diagram that illustrates components of the logical crossbar for audio content of the conference system in one embodiment.

FIG. 4 is a block diagram that illustrates components of the logical crossbar for audio and video content of the conference system in one embodiment. The logical crossbar 400 is a component of the media stack that receives content from multiple sources 441 and 491 of the conference and sends the content to multiple sinks 442 and 492 of the conference. The logical crossbar is configurable to support different conference types such as full mesh, full mix, point-to-point, and so on. The logical crossbar mixes the content and performs conversions as appropriate. For example, the logical crossbar may convert audio content to PCM format for mixing. The logical crossbar attempts to minimize the number of memory copy operations and the number of format conversion operations. The logical crossbar implements these functions using audio router 410, audio mixer 420, and audio format converter 430. The audio router creates the audio routing table which specifies the connections between audio sources and sinks. The audio router also collects content from the audio sources, converts the content as appropriate, determines whether to mix the content, and attempts to minimize the memory copy, encoding, and format conversion operations. The audio router delivers the mixed content to the sinks. The audio mixer produces linear combinations of the audio content from multiple sources and may dynamically adjust the volume of the sources by monitoring the energy level for each source separately. The audio format converter converts the content into requested formats including sampling rate conversion, audio format conversion, and frame size conversion. The audio router includes an add channel component 411, a process engine tick component 412, and a routing table 413. The add channel component is invoked whenever a channel is added to a conference. The add channel component updates the routing table for the conference to specify connections needed to support the new channel. The process engine tick component is invoked periodically (e.g., every 20 milliseconds) to collect source content, mix the source content, and route the mixed source content according to the connections in the routing table. The logical crossbar includes a video components for processing video content. The logical crossbar includes a video router 460, video mixer 470, and video format converter 480. The video router performs tasks analogous to those of the audio router. The video mixer adjusts differing image sizes for mixing, combines the source images into a single output image (e.g., tiling), and applies transition effects when a dominant video stream is changing. The video mixer may mix the video in various ways. For example, the mixer may tile each video into a single image. The video mixer may mix each of the videos so that the same combination of sources is sent to each participant. If each participant were to view the videos from the other participants, but not their own, then a different unique combination of sources would be used for each participant and there would be no sharing of mixed video. The video mixer may also select to mix video by selecting to display the video of the current dominant speaker or may display multiple videos on the faces of a three-dimensional object as described in U.S. patent application Ser. No. 11/073,417, entitled "Method and System for Presenting a Video Conference Using a Three-Dimensional Object," filed on Mar. 4, 2005, which is hereby incorporated by reference. The video mixer may also apply transition effects when the video stream is changing. The video media converter converts the content to requested formats including color space conversion, image size conversion, and video format conversion.

The computing device on which the conference system is implemented may include a central processing unit, memory, input devices (e.g., keyboard and pointing devices), output devices (e.g., display devices), and storage devices (e.g., disk drives). The memory and storage devices are computer-readable media that may contain instructions that implement the conference system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the conference system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The conference system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
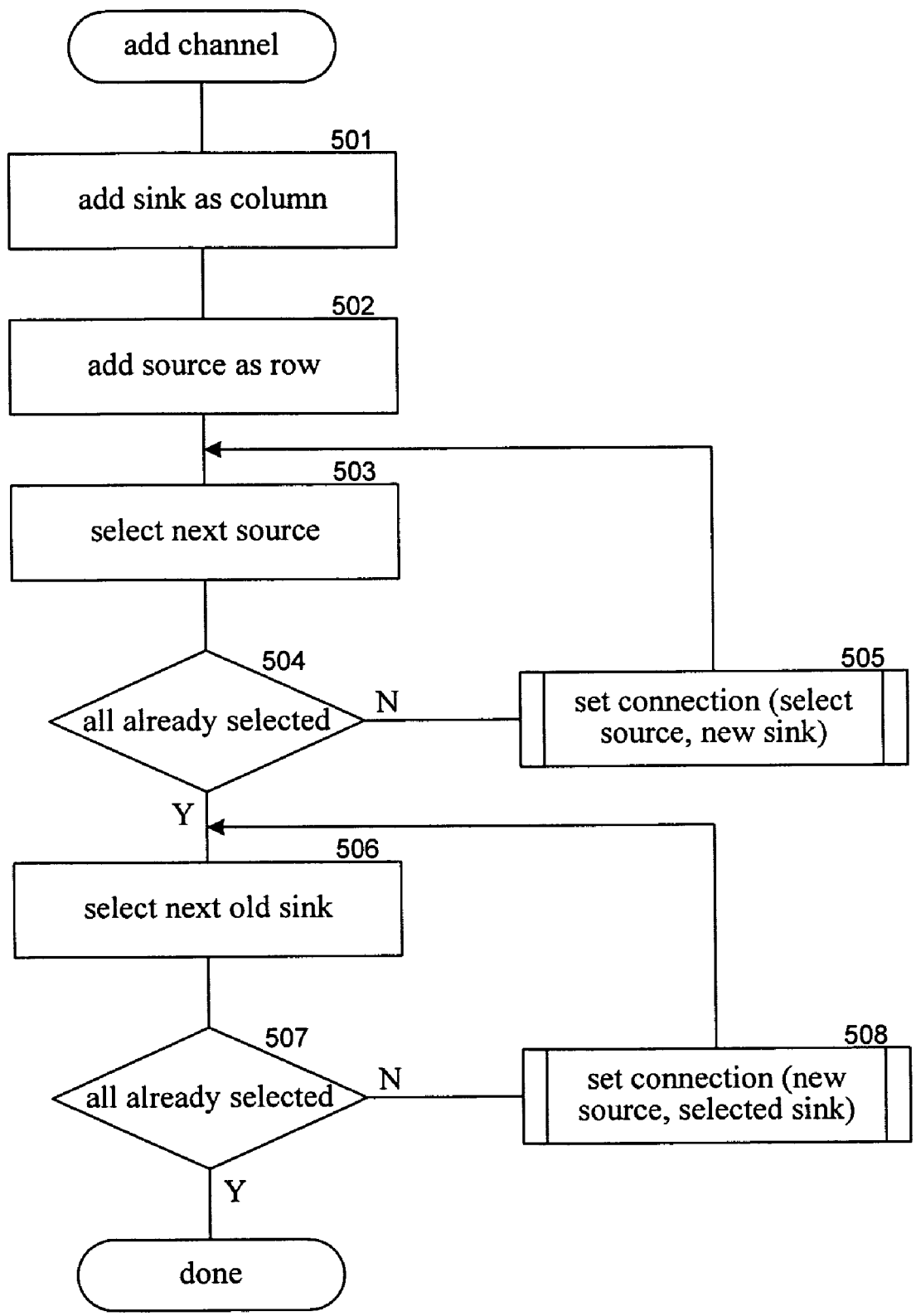
FIG. 5 is a flow diagram that illustrates the processing of the add channel component of the logical crossbar in one embodiment.

FIG. 5 is a flow diagram that illustrates the processing of the add channel component of the logical crossbar in one embodiment. The component is passed an indication of a source and a sink of a channel to add to the conference supported by the crossbar. The source and sink have a source type and sink type. In block 501, the component adds a column for the new sink to the routing table. In block 502, the component adds a new row for the new source to the routing table. In blocks 503-505, the component loops setting the connections for the new sink. In block 503, the component selects the next existing source. In decision block 504, if all the existing sources have already been selected, then the component continues at block 506, else component continues at block 505. In block 505, the component sets the connection for the selected source and the new sink and then loops to block 503 to select the next existing source. In blocks 506-508, the component loops setting the connections for the new source. In block 506, the component selects the next existing sink. In decision block 507, if all the existing sinks have already been selected, then the component completes, else the component continues at block 508. In block 508, the component sets the connection for the new source and the selected sink and then loops to block 506 to select the next existing sink. Although not illustrated by FIG. 5, a channel can have multiple sources and sinks and different channels can share sources and sinks. To support multiple source and multiple sinks, the component invokes the set connection component in blocks 505 and 508 once for each sink and source. The component may also check for shared sources and sinks that are already in the routing table and avoid adding duplicate rows and columns.

Figure 6:
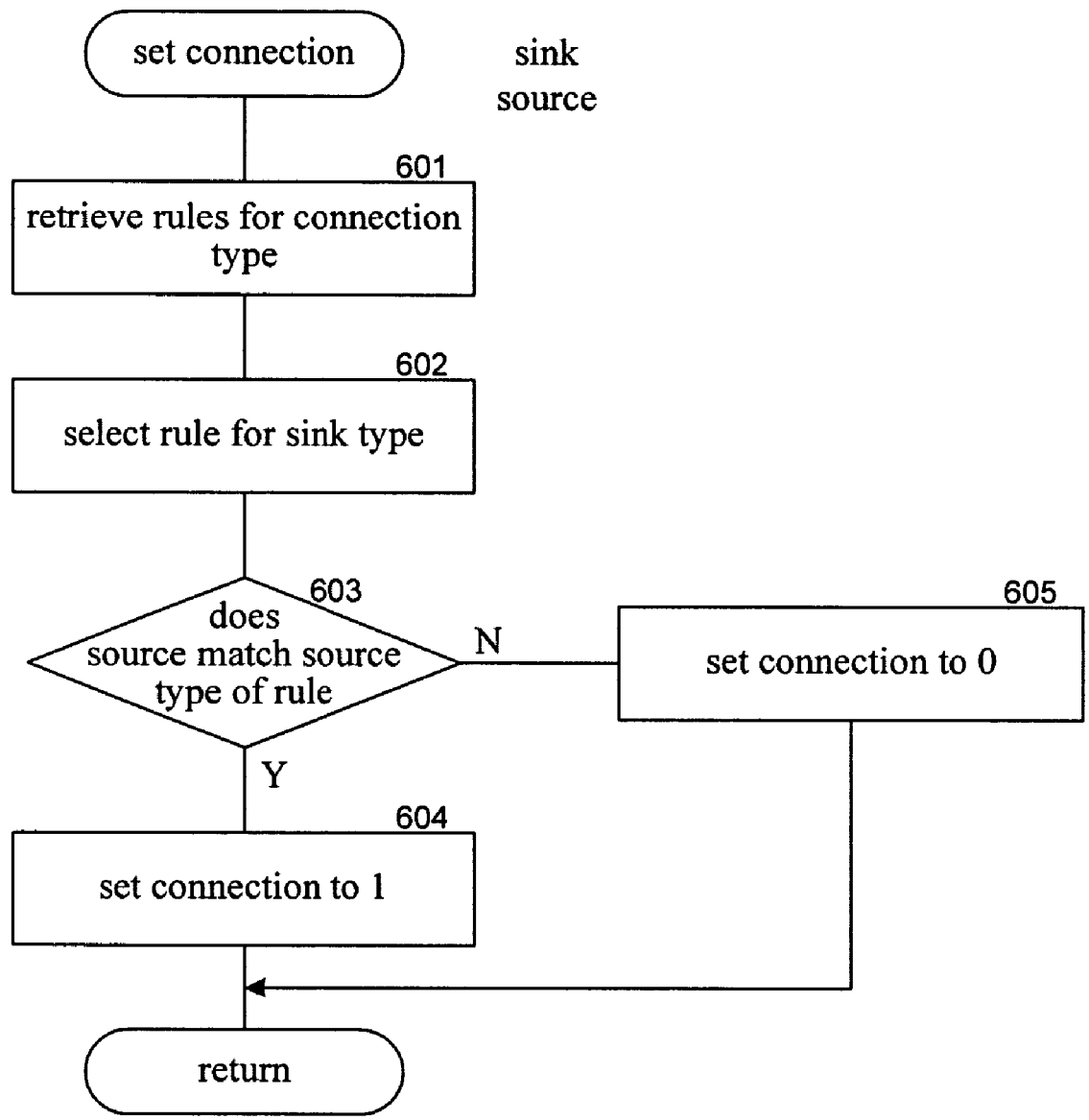
FIG. 6 is a flow diagram that illustrates the processing of the set connection component of the conference system in one embodiment.

FIG. 6 is a flow diagram that illustrates the processing of the set connection component of the conference system in one embodiment. The component is passed a source and a sink of the routing table and uses the rules to set the connection between the source and the sink. In block 601, the component retrieves the rules for the connection type of the conference. In block 602, the component selects the rule for the sink type of the passed sink from the retrieved rules. In decision block 603, if the passed source matches the source type of the selected rule, then the component continues at block 604, else the component continues at block 605. In block 604, the component indicates that the passed sink is connected to the passed source by storing 1 in the routing table and then returns. In block 605, the component indicates that the passed sink is not connected to the passed source by storing 0 in the routing table and then returns.

Figure 7:
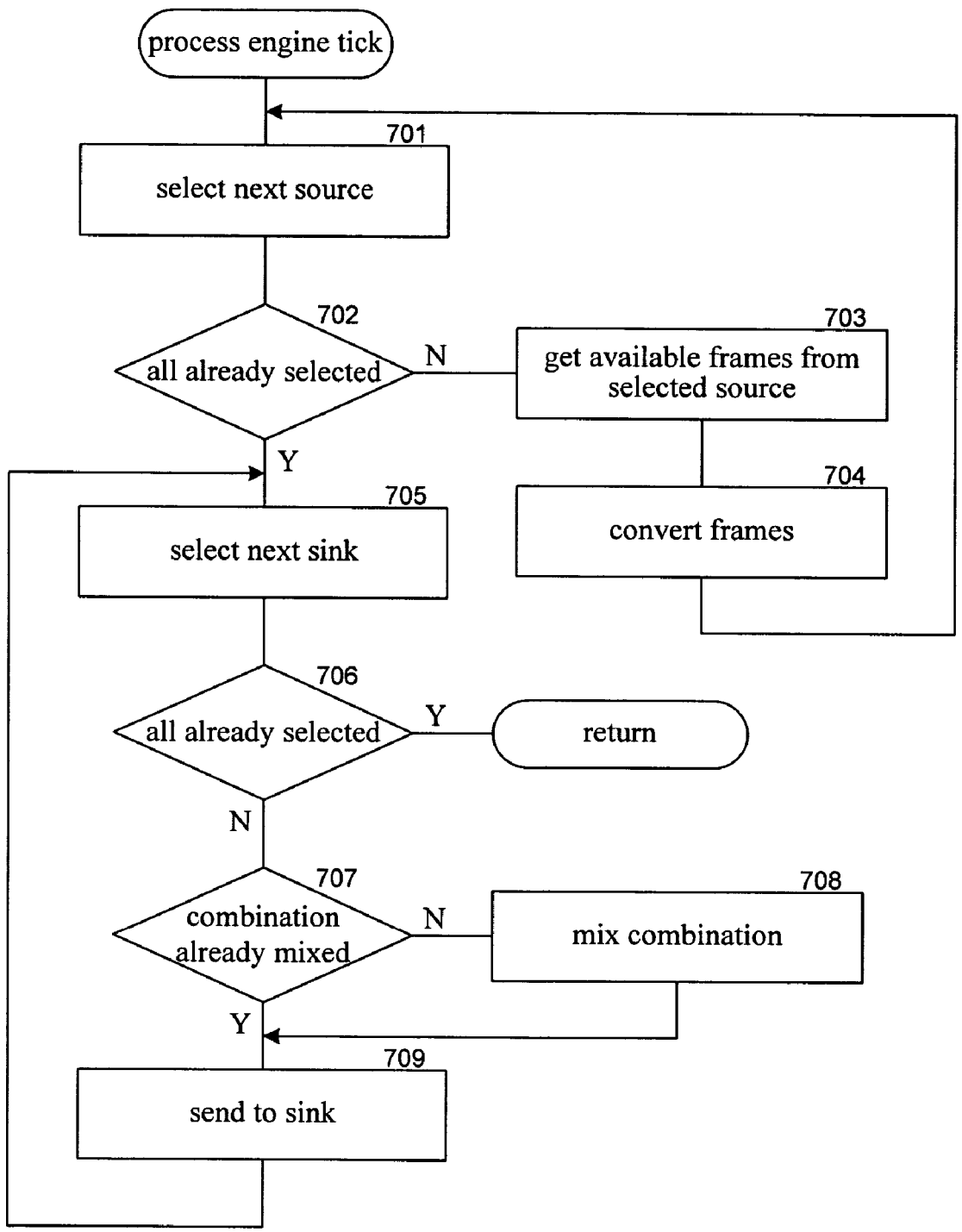
FIG. 7 is a flow diagram that illustrates the processing of the process engine tick component of the logical crossbar in one embodiment.

FIG. 7 is a flow diagram that illustrates the processing of the process engine tick component of the logical crossbar in one embodiment. The component is invoked periodically to collect available content from the sources, perform the mixing and formatting of the collected content, and send the mixed content to the sinks. In blocks 701-704, the component loops collecting the content from the sources. In block 701, the component selects the next source. In decision block 702, if all the sources have already been selected, then the component continues at block 705, else the component continues at block 703. In block 703, the component retrieves the available frames of content from the selected source. In block 704, the component converts the frames as appropriate (e.g., a common format for mixing) and then loops to block 701 to select the next source. In blocks 705-709, the component loops sending the mixed combinations to the sinks. In block 705, the component selects the next sink. In decision block 706, if all the sinks have already been selected, then the component completes, else the component continues at block 707. In decision block 707, if the combination of sources for the sink have already been mixed for another sink, then the component continues at block 709, else the component continues at block 708. In block 708, the component mixes the content of the frames of the sources. In block 709, the component sends the appropriate mixed content to the selected sink and then loops to block 705 to select the next sink.

In one embodiment, the component may use the same buffer when sinks have the same combination of sources. In such a case, the media stack for the sinks may store any encodings in the buffer. If another sink with the same combination of sources needs to use the same encoding, it can use the encoding stored in the buffer, rather than having to regenerate it.

From the foregoing, it will be appreciated that specific embodiments of the conference system have been described herein for purposes of illustration, but that various modifications may be made without deviating from the spirit and scope of the invention. The conference system may update the routing table whenever a source or sink is added to or removed from an existing channel. The conference system may also update the routing table when a property of a source or sink changes. For example, if a property of a sink changes to not allow content to be received from a certain source from which it is currently receiving content, then the conference system updates the routing table. Accordingly, the invention is not limited except as by the appended claims.

I claim:

1. A method in a computer system with a processor and a memory for routing data in a conference with channels having sources and sinks, the method comprising:
   providing in the memory a routing table specifying which sinks are connected to which sources, wherein the providing of the routing table includes:
      for each type of connection, specifying the rules that indicate which sink types are to be connected to which source types; and
      when a channel is added to the conference, updating the routing table to identify connections between the source and sink of the added channel and existing sources and sinks of the conference based on the specified rules for the connection type of the conference;
   upon completion of each of a plurality of time periods during the conference, collecting data for the time period from one or more sources;
      identifying, from the provided routing table and the sources from which the data is collected, unique combinations of sources of the collected data that is to be provided to one or more sinks; and
      for each of a plurality of unique combination of sources, mixing by the processor the data from the sources; and
         for each sink that is to receive collected data for the unique combination of sources, sending to the sink the mixed data for the unique combination of sources that the sink is to receive
      so that, for each unique combination of sources, the collected data for that unique combination of sources need only be mixed once for sending to the sinks that are to receive that mixed data upon completion of the time period.

2. The method of claim 1 wherein a channel is between a local and a remote endpoint.

3. The method of claim 2 wherein the local endpoints have sink types and source types of virtual or non-virtual.

4. The method of claim 3 wherein a virtual source is implemented as a media sender object and a virtual sink is implemented as a media receiver object.

5. The method of claim 1 wherein after the mixed data is sent to a sink, receiving a converted form of the mixed data so that, when the same unique combination of sources is sent to another sink, the mixed data does not need to be reconverted.

6. The method of claim 1 wherein the collecting is performed at periodic intervals.

7. The method of claim 1 wherein the conference types include full mix and full mesh.

8. A computer-readable storage medium containing instructions for controlling a computer system to generate a routing table for a conference with channels having sources and sinks, by a method comprising:
   for multiple connection types, specifying rules that specify which source types are to be connected to which sink types; and
   when a channel is added to the conference,
      identifying connections between the source and sink of the added channel and sources and sinks of existing channels of the conference based on the specified rules;
      updating the routing table to specify the identified connections;
      collecting data from one or more sources upon completion of time periods during the conference;
      identifying, from the routing table and the sources from which the data is collected, unique combinations of sources of the collected data that is to be provided to one or more sinks;
      for each of a plurality of unique combination of sources, mixing the data from the sources; and
      for each sink that is to receive collected data, sending the mixed data for the unique combination of sources that the sink is to receive upon completion of the time period
   so that for each unique combination of sources, the collected data for that unique combination of sources need only be mixed once for sending to the sinks that are to receive that mixed data.

9. The computer-readable storage medium of claim 8 wherein the connection types of the conference include full mix and full mesh.

10. The computer-readable storage medium of claim 8 wherein when the connection type is full mesh, the specified rules indicate to connect local non-virtual sinks to local virtual sources and remote sources, to connect local virtual sinks to local sources and remote sources, and to connect remote sinks to local sources.

11. The computer-readable storage medium of claim 8 wherein when the connection type is full mix, the specified rules indicate to connect local non-virtual sinks to local virtual sources and remote sources and to connect local virtual sinks and remote sinks to local sources and remote sources.

12. The computer-readable storage medium of claim 11 wherein a remote sink is not connected to a remote source from the same endpoint.

13. A computer system for routing data in a conference having sources and sinks, comprising:
   a processor;
   a memory;
   a routing table stored in the memory specifying which sinks are connected to which sources;
   rules for each connection type that indicate which sink types are to be connected to which source types;
   a component that, when a channel is added to the conference, updates the routing table to identify connections between the source and sink of the added channel and existing sources and sinks of the conference based on the rules for connection type of the conference;

a component for collecting data from sources;

a component for execution by the processor that, for each of a plurality of unique combinations of sources that are to be provided to sinks, mixes the collected data so that when two sinks are to receive collected data from the same unique combination of sources, the collected data from that unique combination of sources is mixed only once; and a component that, for each of the plurality of unique combinations of sources sends the mixed data to a media stack for each sink wherein when one of the media stacks for a sink performs a conversion of the mixed data, the converted mixed data is available to the other media stacks to avoid having to convert the mixed data for each media stack that needs the converted mixed data for that unique combination of sources.

14. The computer system of claim 13 wherein the source types and sink types are local virtual, local non-virtual, and remote.

15. The computer system of claim 13 wherein the component that collects performs the collecting at periodic intervals.

16. The computer system of claim 13 wherein the conference types include full mix and full mesh.

* * * * *

UNITED STATES PATENT AND TRADEMARK OFFICE
CERTIFICATE OF CORRECTION

PATENT NO.       : 7,593,986 B2
APPLICATION NO.  : 11/124911
DATED            : September 22, 2009
INVENTOR(S)      : Dalibor Kukoleca It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Twenty-eighth Day of September, 2010

David J. Kappos
*Director of the United States Patent and Trademark Office*